Sept. 10, 1940.  H. GOTHE  2,214,325
SHAPING OF ICE CREAM
Filed Nov. 1, 1937
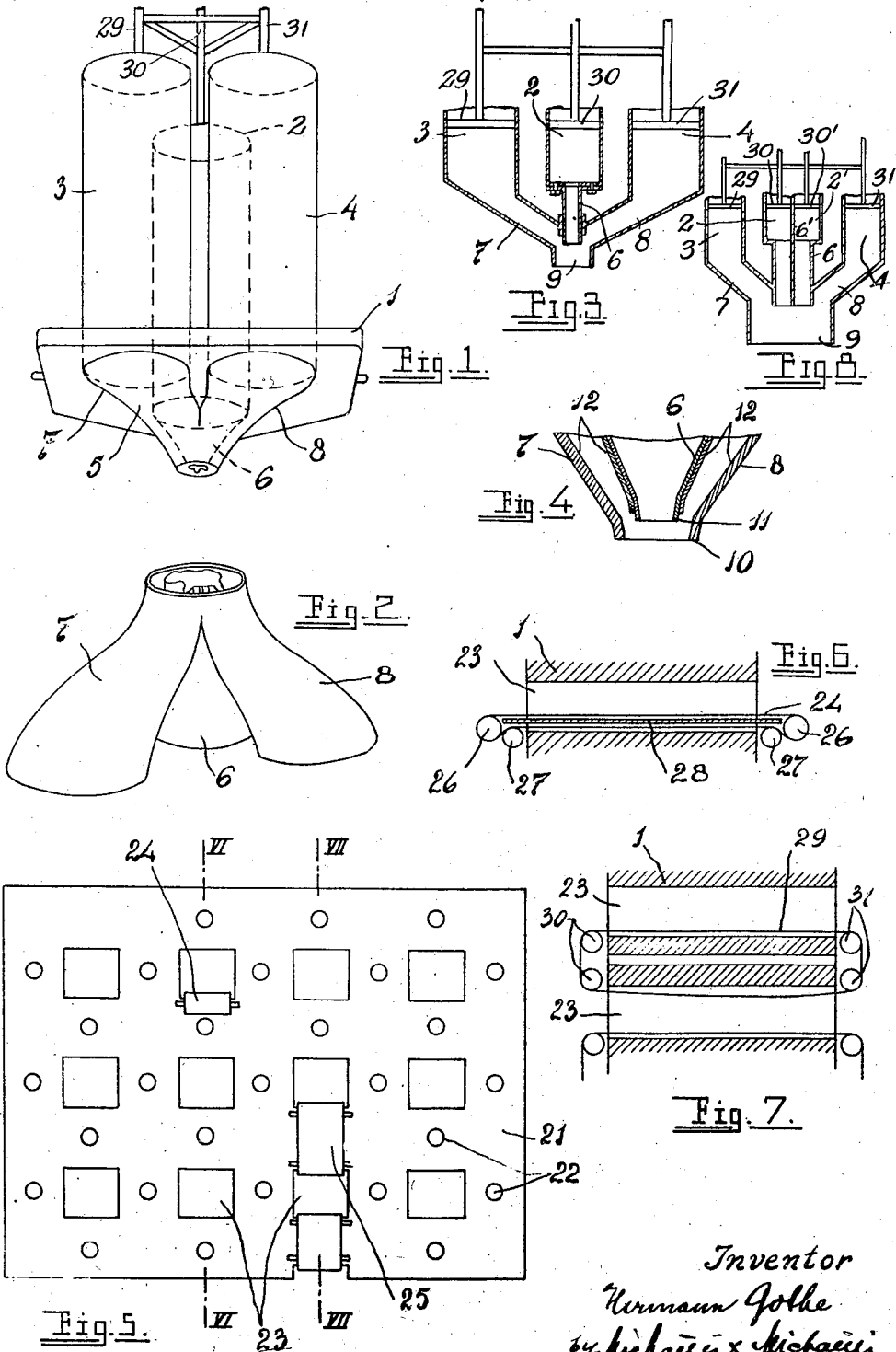

Patented Sept. 10, 1940

2,214,325

UNITED STATES PATENT OFFICE 2,214,325

SHAPING OF ICE CREAM

Hermann Gothe, Potsdam, Germany

Application November 1, 1937, Serial No. 172,237
In Germany November 4, 1936

3 Claims. (Cl. 107—1)

My invention relates to means for forming ice cream into portions and more especially to the production of portions of ice cream of a novel kind, which are composed of different kinds of ice cream extruded in different streams, one or several streams being surrounded by or enveloped in one or a plurality of other streams, preferably in such manner that each portion has the contours of or represents an image, for instance an animal, a flower or the like.

With an extruding device according to my invention I am able to dispense ice cream under a particularly pleasing form and my device enables me to quickly divide and dispense ice cream with a minimum of expense.

I prefer combining this device with a refrigerator of some suitable kind, in which the extruded streams are cooled down to the extent of attaining the best degree of hardness and becoming suitable to be cut into portions.

The extruding device substantially consists in the combination of a plurality of containers, positioned either horizontally or vertically, each container being filled with some particular kind of ice cream, which is extruded from the container by means of a piston. The several containers are combined with a mouth-piece common to all, which is so designed that the preferably funnel-shaped extensions of the outer containers surround the ends of one or a plurality of extensions of the inner containers so that the different streams of ice cream extruded from the outer containers will meet and surround the ice cream extruded from the inner container or containers.

In the drawing affixed to this specification and forming part thereof some embodiments of my invention are illustrated diagrammatically by way of example.

In the drawing:

Fig. 1 is a perspective diagrammatic view of the combination of two outer containers and one inner container, all ending in a common mouth-piece.

Fig. 2 is a similar view, drawn to a larger scale, of the mouth-piece.

Fig. 3 is a diagrammatic axial section of the combination of parts shown in Fig. 1, in which the inner mouth-piece is rendered exchangeable.

Fig. 4 is a similar view, drawn to a larger scale, of the mouth-piece proper.

Fig. 5 is a plan view of a refrigerator adapted to cooperate with the dividing device, and Figs. 6 and 7 are diagrammatic sections, drawn to a larger scale, on the lines VI—VI and VII—VII of Fig. 5, respectively.

Fig. 8 is a view, similar as Fig. 3 of a combination with two inner containers.

Referring to the drawing and first to Figs. 1 to 4, I is the foundation plate of the dividing and portion forming device and 2, 3 and 4 are three cylinders mounted in apertures formed in this plate, while 5 is the mouth-piece being the combination of three funnels 6, 7 and 8, the funnels 7 and 8 located below the outer cylinders 3 and 4 surrounding the funnel 6 located below the inner cylinder 2. As shown in the drawing, the bottom end of the inner funnels 6 is contracted and shaped in such manner that its edge forms the outline of an animal (a bear), while the outer funnels 7 and 8 converge towards the inner funnel 6, the top part of their edges being spaced from the bottom edge of the inner funnel 6, which thus projects into the path of the ice cream issuing from the cylinders 3 and 4. 29, 30 and 31 are pistons reciprocating in the containers 2, 3 and 4, respectively, with their piston rods connected with each other for extruding ice cream from these containers. 9 is the exhaust opening of the mouth-piece proper.

In the modification shown in Fig. 8 the inner container is divided by the wall $6^1$ into two compartments 2 and $2^1$, in which reciprocate pistons 30 and $30_1$ respectively.

The funnel 6 of the middle cylinder is preferably arranged to be readily exchanged, so that various outlines of the middle part of a portion can be formed. The funnel may be connected with the bottom of the container 2 by means of screws and bolts as illustrated in Fig. 3.

In order that the different kinds of ice cream can be assembled in a well defined manner, the bottom edge 10 of the mouth-piece is preferably located somewhat below the bottom edge 11 of the funnel 6 (Fig. 4) and the exhaust ends of the mouth-piece and the funnels are preferably conical.

In order to prevent the ice cream issuing from the inner cylinder or cylinders from acquiring an unduly high degree of hardness when surrounded by the outer ice cream sections, I prefer lining the bottom parts of the funnels with a heat insulating lining 12, and I may also provide means for heating the exhaust ends of the funnels and mouth-piece.

The skeins formed with the aid of the device here above described are preferably cooled in a refrigerator such as shown in Figs. 5 to 7, wherein 21 is the body of the refrigerator, while 22 are parts of a tube system, in which circulates a cooling liquid of some well known kind, while 23 are canals traversing the refrigerator body and serving for cooling the ice cream skeins, which are conveyed from the dividing device into these canals by means of conveying belts 24 or 25, respectively.

Fig. 6 is a cross section of a conveyor such as shown in the top row of canals in Fig. 5, the endless belt 24 passing around cylinders 26 and over guide cylinders 27, so that both reaches of the belt pass through the same canal 23, 28 being a plate separating the two reaches.

In the modified form of the conveyors shown in Fig. 7 the conveying belt 29 is passed around two pairs of cylinders 30, 31, which are so arranged, that one reach of the belt extends through one canal, the other through the adjoining canal.

The ice cream portions are either stored in or passed slowly through the canals 23 and frozen hard, while during the shaping process occurring in the extruding device the cream must be more plastic.

Preferably short wooden sticks are stuck in the portions to serve as handles.

I wish it to be understood that I do not desire to be limited to the exact details of construction shown and described for obvious modifications will occur to a person skilled in the art.

I claim:

1. An ice cream extruding device comprising in combination, an inner container, a plurality of outer containers flanking said inner container, funnel-shaped mouth-pieces associated with said outer containers, a mouth-piece associated with said inner container and surrounded by the mouth-pieces of said outer containers, the edges of the outer mouth-piece projecting beyond the edge of the inner mouth-piece, and means for simultaneously extruding ice cream from each of said containers through said mouth-pieces.

2. The device of claim 1, in which the inner mouth-piece has a contour resembling some distinct article and is arranged to be readily exchanged.

3. An ice cream extruding device comprising in combination, a plurality of inner containers, a plurality of outer containers flanking said inner containers, funnel-shaped mouth-pieces associated with said outer containers, a mouth-piece commonly associated with said inner containers and surrounded by the mouth-piece formed by the merging of the plurality of said outer mouth-pieces, the edges of the outer mouth-piece projecting beyond the edge of the inner mouth-piece, and means for simultaneously extruding ice cream from each of said containers through said mouth-pieces.

HERMANN GOTHE.